United States Patent [19]

Sugiyama

[11] Patent Number: 5,790,330
[45] Date of Patent: Aug. 4, 1998

[54] METHOD OF RECORDING MAGNETIC INFORMATION ON A ROLL OF FILM USING A SECONDARY RECORDING MEDIUM

[75] Inventor: Naoshi Sugiyama, Asaka, Japan

[73] Assignee: Fuji Photo Film Co. Ltd, Kanagawa, Japan

[21] Appl. No.: 518,885

[22] Filed: Aug. 24, 1995

[30] Foreign Application Priority Data

Sep. 1, 1994 [JP] Japan ............................ 6-208678

[51] Int. Cl.⁶ .......................................... G11B 5/00
[52] U.S. Cl. ............................ 360/1; 396/310; 396/319
[58] Field of Search ................... 360/3, 48, 1; 396/310, 396/319–321, 429

[56] References Cited

U.S. PATENT DOCUMENTS

| | | | |
|---|---|---|---|
| 5,315,578 | 5/1994 | Furukawa | 369/275.3 |
| 5,381,275 | 1/1995 | Nitta et al. | 360/48 |
| 5,434,716 | 7/1995 | Sugiyama et al. | 360/48 X |
| 5,502,527 | 3/1996 | Kazami et al. | 360/3 X |
| 5,625,517 | 4/1997 | Sawada et al. | 360/69 |

FOREIGN PATENT DOCUMENTS

| | | |
|---|---|---|
| 4-503871 | 7/1992 | Japan . |
| WO9103762 | 3/1991 | WIPO . |

*Primary Examiner*—Aristotelis M. Psitos
*Assistant Examiner*—Regina Y. Neal

[57] ABSTRACT

When a volume of magnetic information to be recorded in a film exceeds a recording capacity of the film, a part or all of the magnetic information is recorded in an outer record medium. At this time, ID information which identifies the outer record medium is recorded in a leader track on the film, so that the film can correspond to the outer record medium. An ID number, for example, is used as the ID information. When the magnetic information is read out from the film, the ID information which identifies the outer record medium is read out at first. Then, it is judged whether the outer record medium is used or not. If the outer record medium is used, the magnetic information is read out from the outer record medium, and various kinds of processing are carried out in accordance with the readout magnetic information and the magnetic information which is recorded on the film.

20 Claims, 6 Drawing Sheets

METHOD OF RECORDING MAGNETIC INFORMATION ON A ROLL OF FILM USING A SECONDARY RECORDING MEDIUM

BACKGROUND OF THE INVENTION

1. Field of the Invention

The present invention relates to a method of recording magnetic information and more particularly to a method of recording magnetic information which can increase a capacity for recording magnetic information on a film having a magnetic record layer.

2. Description of the Related Art

Conventionally, there is proposed a method of processing a film for development, in which information indicating whether a shutter release button shutter is sequentially released or not at the time of photo-taking with a camera, etc. are recorded as magnetic information on a film strip in which information can be magnetically recorded, and in which the development is carried out at a laboratory, etc. in accordance with the information (Japanese Patent Application Laid-open No. 4-503871).

There is also proposed a method of recording conditions for development and printing in a non-volatile RAM which is attached to a film cartridge, and carrying out the processing for development and printing in accordance with the recorded conditions at the laboratory and a development agency.

However, a capacity for recording information in the film and the film cartridge is limited. Therefore, there is a problem in that the recording capacity of the film or the film cartridge is not sufficient for the complicated information relating to the film.

SUMMARY OF THE INVENTION

The present invention has been developed under the abovedescribed circumstances, and has its aim the provision of a method of recording magnetic information, which increases a recording capacity of a film by using an outer record medium and changing a recording method, and in which the outer record medium can be retrieved and collated.

To achieve the above-mentioned objects, a method of recording magnetic information, in which magnetic information is recorded in a magnetic track on a roll of photographic film, comprises the steps of dividing the magnetic track into a leader track in a leader part at a forward end of the film and a frame track which is located at the rear of the leader part and corresponds to each frame track, recording a part or all of magnetic information, which is to be recorded in the leader track and the frame track, in an outer record medium, and recording ID information identifying the outer record medium in the leader track.

Moreover, according to the present invention, the method of recording magnetic information comprises the steps of recording information as to the density, at which the magnetic information is recorded in the frame track, in the leader track, and recording the magnetic information in the frame track with the density, at which the magnetic information was recorded in the leader track.

Furthermore, in the method of recording the magnetic information, the recording density for the magnetic information and/or the number of times which the same magnetic information is recorded is variable according to the volume of the magnetic information, which is to be recorded in the magnetic track.

According to the present invention, a part or all of the magnetic information, which is to be recorded in the leader track and the frame track on the photographic film having a magnetic record layer, is recorded in the outer record medium, and the information which identifies the outer record medium is recorded in the leader track on the photographic film. As a result, the capacity for recording magnetic information can be increased. If the information which identifies the outer record medium, which is recorded in the leader track, is read and visibly displayed, the outer record medium, in which the magnetic information relating to the film is recorded can be retrieved.

According to the other mode of the present invention, the recording density, with which the magnetic information is recorded in the frame track, is recorded in the leader track on the photographic film, and the magnetic information is recorded in the frame track with the recording density being recorded in the leader track. As a result, the magnetic information can be recorded with the high density, and the capacity for recording the magnetic information can be increased.

According to the other mode of the present invention, the recording density with which magnetic information is recorded in the frame track and/or the number of times which the same magnetic information is repeatedly recorded is determined according to the capacity for recording the magnetic information which is to be recorded in the magnetic track. Then, the magnetic information is recorded in the magnetic track in accordance with the recording density for the magnetic information and/or the number of times which the same magnetic information is repeatedly recorded. As a result, the recording density and the number of times the magnetic information is repeatedly recorded can be changed according to the volume of the magnetic information, and the capacity for recording the magnetic information can be changed as the need arises.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures and wherein.

DESCRIPTION OF THE PREFERRED EMBODIMENT

Detailed description will hereunder be given of the preferred embodiment of a method of recording magnetic information according to the present invention with reference to the accompanying drawings.

Figure 1:
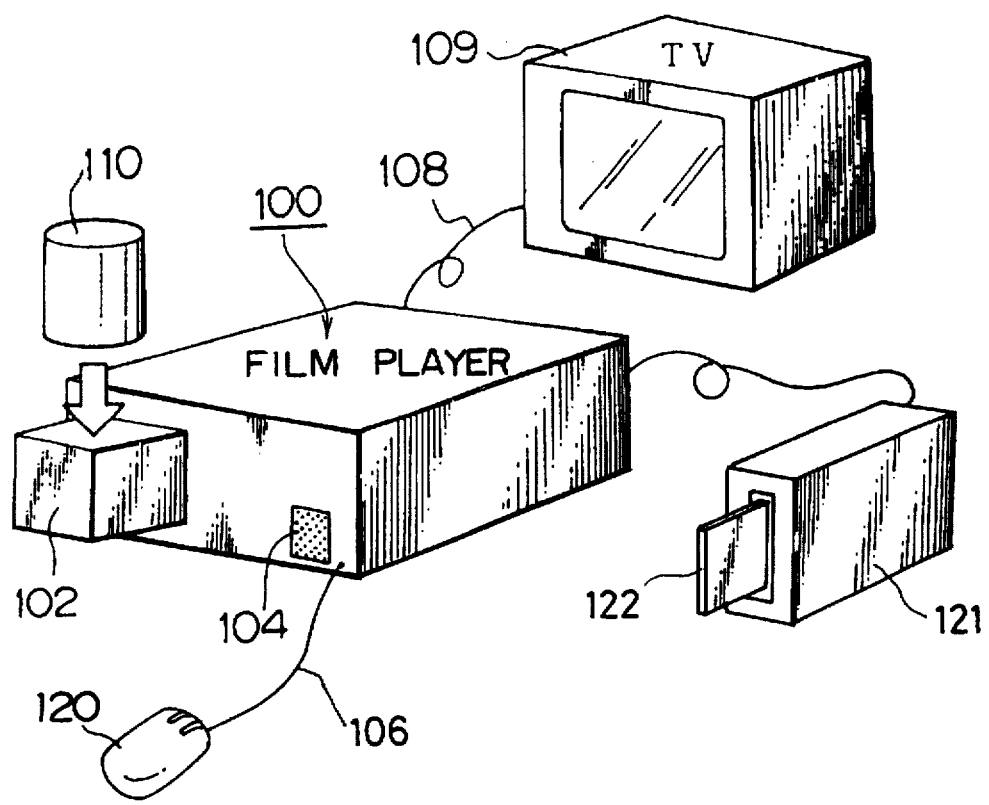
FIG. 1 is an external view of a film player to which a method of recording magnetic information is applied.

FIG. 1 is an external view of the film player to which the method of recording magnetic information is applied. As shown in the drawing, the film player 100 has a rectangular-parallelepiped shape, and a film cartridge tray 102 and a power source switch 104 are provided on the front surface of the film player 100. The film cartridge tray 102 is driven to move forward and backward when the film cartridge 110 is loaded and unloaded, so that the film cartridge 110 can be housed and taken out.

A mouse 120, a TV monitor 109 and a disk driver 121 (which is used as an outer record medium, of which explanation will be given later) are connected to the film player 100. Various types of operational signals for controlling the film player 100 is transmitted from a mouse 120 to the film player 100 via a signal cable 106. A video signal is transmitted from the film player 100 to the TV monitor 109 via a signal cable 108.

Figure 2:
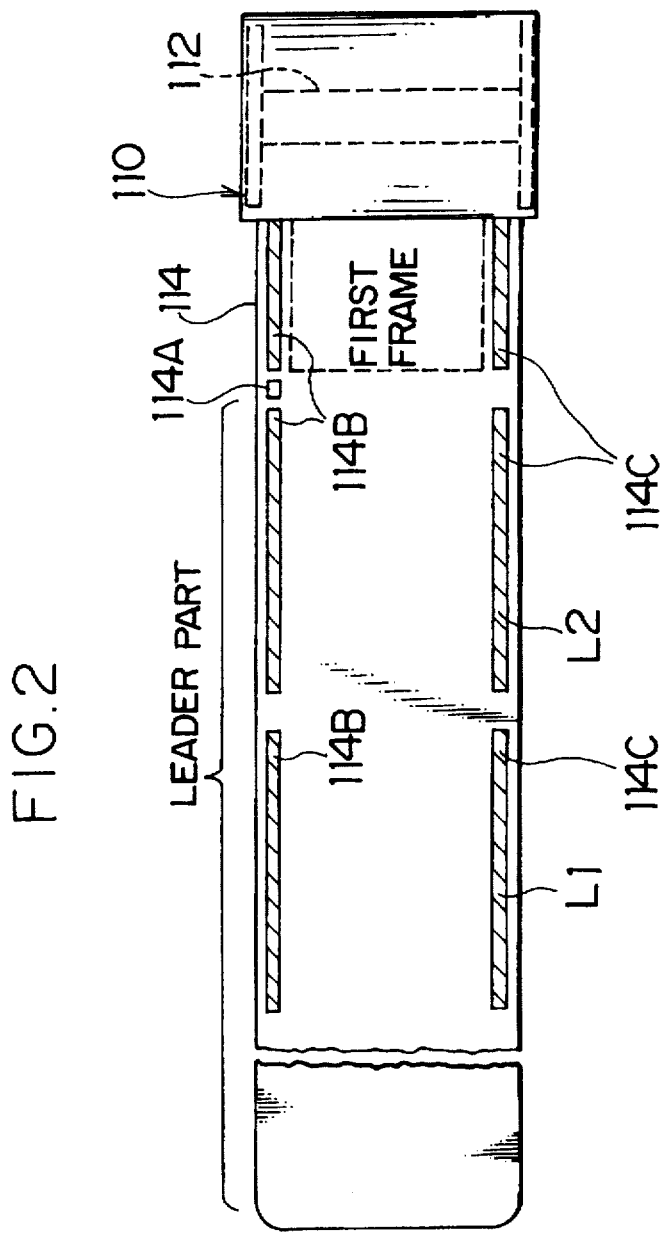
FIG. 2 is a view illustrating one example of a film cartridge applied to the film player of FIG. 1.

As shown in FIG. 2, the film cartridge 110 has a single spool 112, and a photographic film 114 is wound around the spool 112. A perforation 114A is provided in the film 114 to indicate a position of each frame. A transparent magnetic record layer is provided in the film 114, and magnetic tracks 114B and 114C are formed at the edge of the film 114. The magnetic track 114B; is a track for a laboratory and a development agency, and the magnetic track 114C is one for a user.

Here, in a roll of the film, a part between the forward end of the film and the perforation 114A which indicates the position of the first frame is called a leader part, and the part of the film following the perforation 114A indicating the first frame is called a frame part. The magnetic tracks 114C located in the leader part are called leader tracks L1 and L2, and the magnetic track located in the frame part is called a frame track. Information concerning the film as a whole is recorded in the leader track and, information relating to each frame is recorded in each frame track.

The magnetic information is recorded in these tracks by a camera which is provided with a magnetic head, a film player 100 and the like. The magnetic information which is recorded by the camera relates to, for example, photographing conditions, pseudo-zooming, frame numbers, print format which indicates whether the image is high-definition, panoramic, or normal image, the date/time of photographing, and so forth, and many types of information can be recorded by the camera.

Moreover, the developed photographic film 114 is wound into the film cartridge 110, so that it can be stored.

Figure 3:
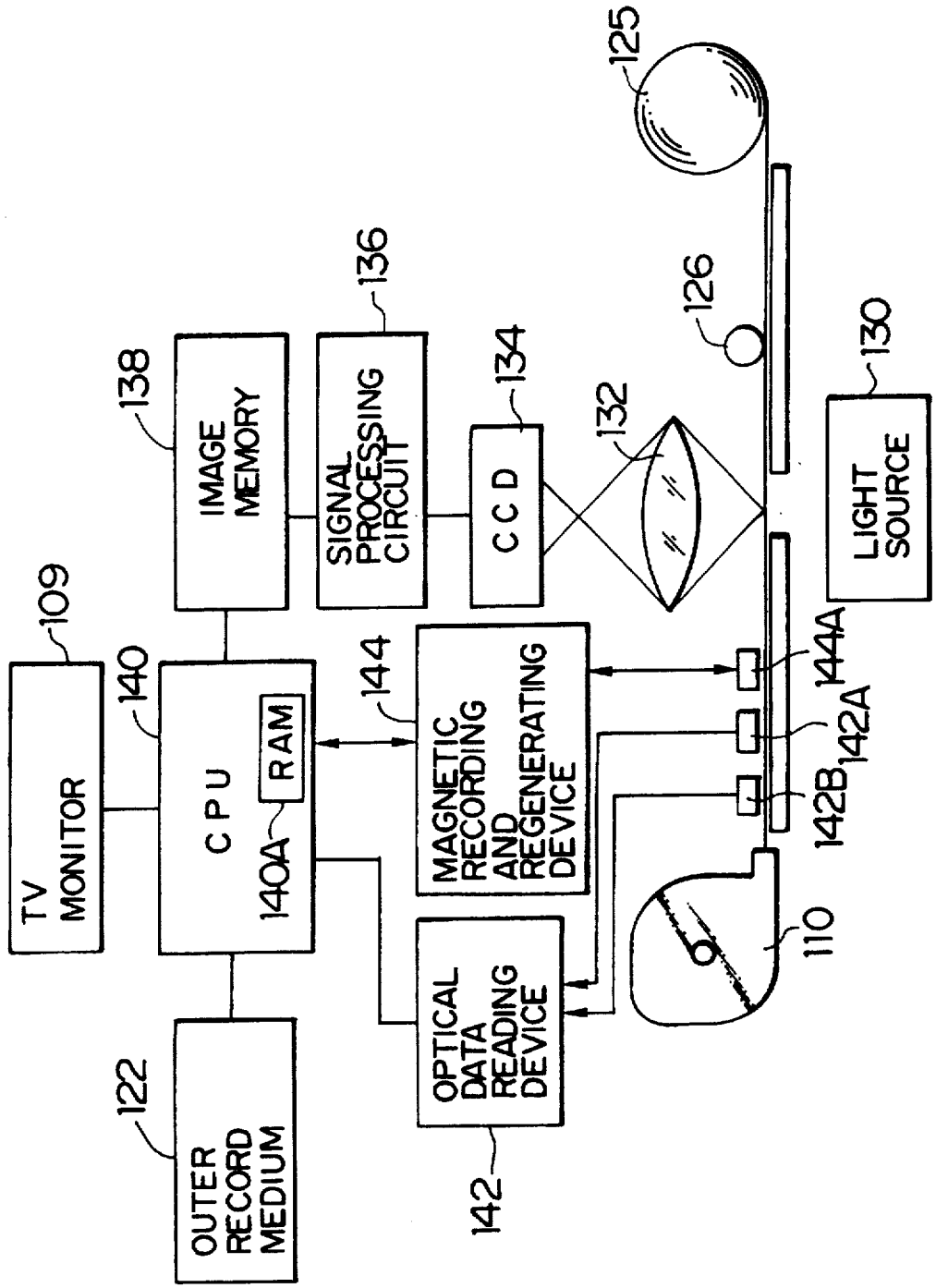
FIG. 3 is a block diagram illustrating one embodiment of the inner structure of the film player which is shown in FIG. 1.
Figure 4:
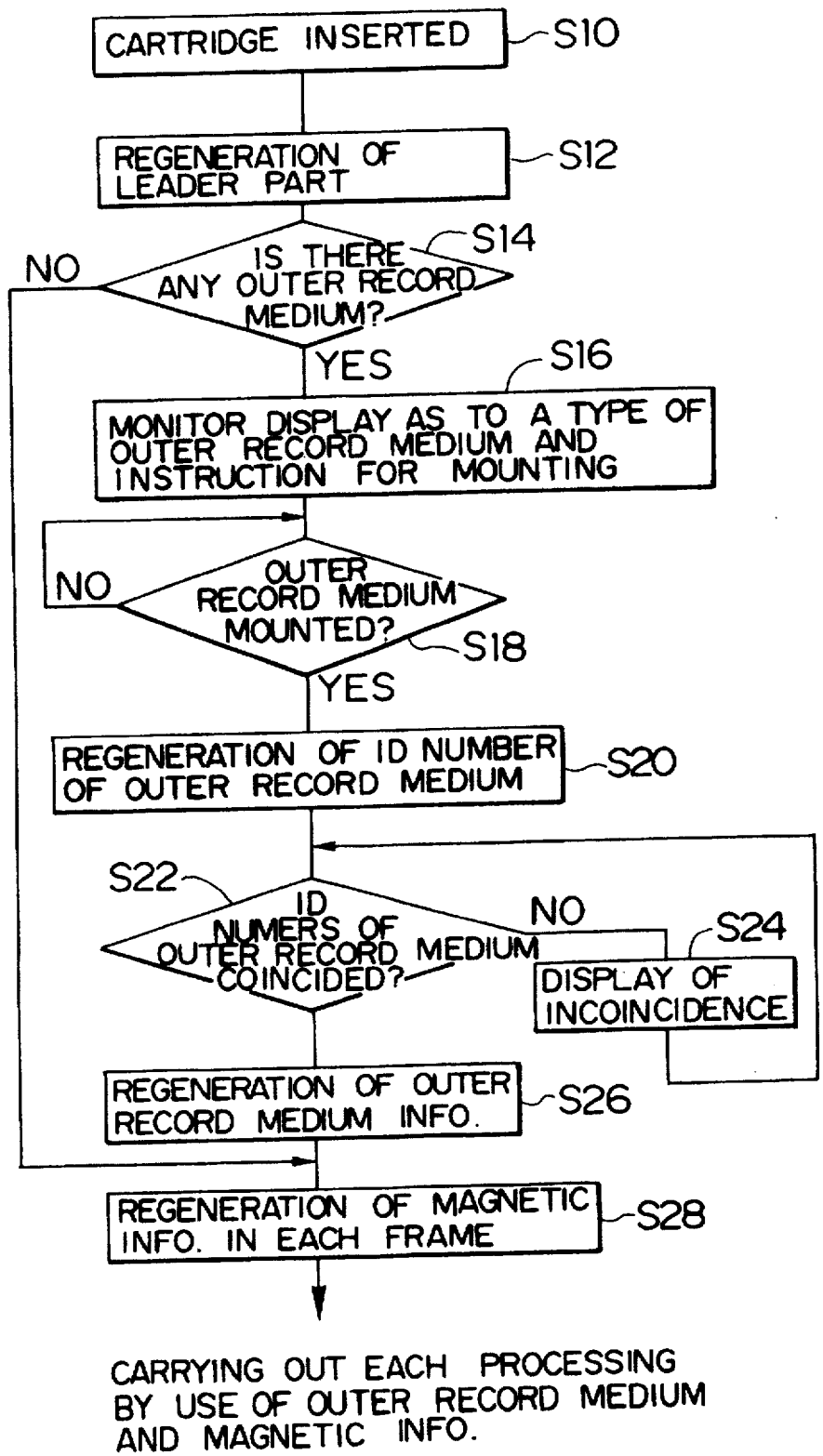
FIG. 4 is a flow chart illustrating the operation of the film player which is shown in FIG. 1.

FIG. 3 is a block diagram illustrating one embodiment of the inner structure of the film player 100. The film player 100 mainly comprises a light source 130, a taking lens 132, a CCD line sensor 134, a signal processing circuit 136, an image memory 138, a central processing unit (CPU) 140, an optical data reading device 142, a device 144 for magnetic recording and regeneration, and the like.

As shown in the drawing, the film cartridge 110 is mounted in a film supplying part, and the film 114 sent out from the film cartridge 110 is wound around a winding axis 125 in a film winding part.

When an image on a frame of the film is read, and when magnetic information is read or written in the magnetic track 114C, the capstan 126, controls a conveyance speed for the film 114. In particular, when an index image is displayed (all of the images on the frame of the film 114 are thinned out to be read, and plural images are simultaneously displayed on the TV monitor 109) and when the magnetic information is pre-scanned and written, the capstan 126 controls the speed to be fixed.

And, a position of the perforation, which is formed on the film 114, is detected by a perforation sensor 142 included in the optical reading device 142, and positions of each frame and each magnetic track are identified. As a result, it is possible to perform reading the image of the frame and reading/writing magnetic information at a prescribed position of the film.

The image on the frame of the film 114, which is being conveyed in a feed direction, is illuminated by the light source 130, and the image light passing through the film 114 is read by the CCD line sensor 134, so that the image of each frame can be read.

The light source 130 is, for example, a long fluorescent light which is provided in the direction perpendicular to the feed direction of the film 114. It illuminates the film 114 through an infrared cutting filter (which is not shown in the drawing). The image light passing through the film 114 is formed on a light-accepting surface of the CCD line sensor 134 through the taking lens which is a fixed-focus type.

The CCD line sensor 134 is provided in the direction perpendicular to the film feed direction. The image light, which is formed on the light-accepting surface of the CCD line sensor 134, is charged for a predetermined period of time in each sensor which has filters R, G and B. Then, the image light is converted into signal charge R, G and B corresponding to the light strength. The signal charge, which is accumulated in this way, is sequentially read out by the signal processing circuit 136.

The signal processing such as white-balance adjustment, γ-correction, etc. is carried out for the signal charge, which is read out from the CCD line sensor 134 in the signal processing circuit 136. Then, the signal charge is converted into a video signal. The video signal is transmitted to the TV monitor 109, so that the image of the frame can be displayed on a screen.

When the index image is displayed, the output video signal from the signal processing circuit 136, is stored in the image memory 138, and all the images of the frame recorded on the film 114 are stored in the image memory 138. The film 114 has forty frames as a whole. For example, each image on twenty frames are read out from the frame images stored in the image memory 138, and the readout frame images are simultaneously displayed in a divided screen of the TV monitor 109. To display the remaining twenty frame, the screen is scrolled up and down with the instruction transmitted by an entry means such as a mouse.

When the information, which relates to the print order for the laboratory and the automatic regeneration information (when the film cartridge 110 is mounted in the film player, the regeneration is automatically carried out in accordance with the information as to a display time of frames, a correct position, a close-up, etc., which are previously set) can be set on the index screen. The information is set with the mouse and the like by a method of on-screen interaction. The set information is recorded in a RAM 140A of the CPU 140.

The information in the RAM 140A is recorded as the magnetic information at a predetermined position in the magnetic track on the film 114 when the film cartridge 110 is taken out. However, when a volume of the magnetic information exceeds the recording capacity of the film, it can be recorded in the outer record medium 121.

The magnetic information is read and written in the magnetic track on the film 114 by the device 144 for magnetic recording and regeneration. The device 144 includes the magnetic head 144A, and reads the magnetic data recorded in the magnetic track 114C on the film with the magnetic head 144A. Then, the device 144 processes and transmits the readout magnetic data to the CPU 140 to record it in the RAM 140A. Also, the device 144 reads out the data recorded in the RAM 140A in the CPU 140, and converts the readout data into a signal which is appropriate for magnetic recording. Then, it transmits the signal to the magnetic head 144A to record it in the magnetic track 114C on the film 114.

The optical data such as a bar code, etc. which indicate an ID number of the film cartridge 110 is read by an optical sensor 142B included in the optical reading apparatus 142. The apparatus 142 processes the optical data, which was detected by the optical sensor 142B, and transmits it to the CPU 160.

Next, an explanation will be given of the outer record medium 121. It is possible to set information concerning the order for the laboratory, automatic regeneration which is performed in accordance with information instructed by a user, and the like in the above-mentioned film player. Then, the set information is recorded at a predetermined position in the leader track and the frame track on the film.

For example, the information as to the order for the laboratory is as follows:

<What is Recorded in the Leader Track>

Roll title information: information relating to a title of the film as a whole.

Roll title printing information: information relating to the designation as to whether there is a print or not, a print color, a position of a print (surface, back, and so forth), a form of a character (outline type, half, non-background, etc.)

Information as to the order for special prints: information relating to an index print, whether there is a post card or not.

Print surface information: information relating to the designation of silk, gloss, etc.

Print size information: information relating to the designation of economic size, large size, king size, etc.

Information as to the number of prints ordered: the total number of prints, the number of prints for each size, the number of close-up prints, the number of prints for which a title/the date and time are designated.

Information as to the designation for ordered frames: the designation information relating to whether there is a reprint for each frame (for example, 1–40 frames).

<What is Recorded in the Frame Track>

Information as to the number of reprints: information relating to the number of reprints for each frame.

Frame title information: information relating to a title of each frame.

Frame title character information: information relating to whether there is a character to be printed or not, a color of a character to be printed, a position of a character to be printed, the form of a character, etc.

Information as to printing of the date and time of photographing: information relating to the date and time of photographing.

Close-up information: information relating to a magnification and a central position.

Print format information: the information relating to the designation of each format, normal, hi-vision, and panoramic.

Up-down and right-left information: information relating to the up-down and right-left at the time of printing (the direction in which a title and the date and time are printed).

Color correction information: information relating to the designation of color correction from the user at the time of reprinting (red-tinged, dark . . . ).

The automatic regeneration information is as follows:

<Automatic regeneration>

Leader track: color correction and a number of a start frame.

Frame track: information relating to color correction, a special monitor effect, a close-up, a length and breadth of a frame, screen-switching, movement on a screen, a time of screen display, a frame number of an end frame, a frame number of a next frame, designation of a non-regenerated frame, sound at the time of regeneration, characters, the date and time of photographing and designation of character display.

However, various kinds of the service are provided by the film player, etc. in addition to the above-mentioned service. Therefore, when the volume of the information as to the service increases, there is a problem in that the recording capacity of the film 114 is not sufficient.

Accordingly, in the case that magnetic information cannot be recorded within the recording capacity of the film 114, magnetic information which cannot be recorded is recorded in the outer record medium.

The outer record medium 122 is connected to the CPU 140 and exchanges data with it. Examples of the outer record medium 122 are a hard disk, a floppy disk, an optical magnetic disk, an IC memory card, etc. The user selects which is used as the outer record medium 122. If an outer record medium is applied to a certain film, an ID number of the outer record medium is recorded in the leader track of this film, so that the film can correspond to the outer record medium.

Incidentally, the method of making the film correspond to the outer record medium is not limited to this. The ID number of the film for identifying the film can also be employed. That is, the ID number of the film is recorded as the optical data such as the bar code, etc. in the film, or recorded as the magnetic data in the magnetic track. If the outer record medium is used, the ID number of the film is recorded in the outer record medium, so that the film can correspond to the outer record medium.

In this embodiment, the ID number of the outer record medium and the like are used so that the film can correspond to the outer record medium. A floppy disk is used as the outer record medium, and a disk driver 121 is connected to the film player 100.

An ID number is recorded in the floppy disk 122 in advance, and the ID number is printed on the external surface of the floppy disk 122. As a result, a desired floppy disk 122 can be looked for by its appearance.

Next, an explanation will be given of the procedure for reading magnetic information concerning a film in a film player. First, when the film cartridge 110 is set in the film cartridge tray 102 (Step S10), the CPU 160 carries out the film-loading. That is, the CPU 160 sends out the film 114 from the film cartridge 110, and the forward end of the film is wound around the winding axis of the film winding part.

When the film-loading is completed, the magnetic information, which is recorded in leader tracks L1 and L2 located in the forward end portion of the film 114, is read by the device 144 for magnetic recording and regeneration (Step S12). Then, it is judged by the magnetic information whether or not the external record medium is used for the film (Step S14). If it is not used, the operation proceeds to S28, and the magnetic information is read out from the magnetic track in the film 114.

On the other hand, if the outer record medium is used, the ID number identifying the outer record medium is read from the magnetic information, which has been read out from the leader tracks L1 and L2. Then, the ID number is displayed on the TV monitor 109, and information is displayed for instructing to mount the outer record medium, which corresponds to the ID number (Step S16).

Next, it is judged whether the outer record medium is mounted or not (S18). If the floppy disk is used as the outer record medium as described in this embodiment, it is judged whether or not the floppy disk 122 is mounted in the disk driver 121. If the floppy disk 122 is not mounted, the information is displayed on the TV monitor 109 for instructing to mount the floppy disk, which corresponds to the ID number recorded in the film, in the disk driver 121.

When the user inserts floppy disk 122 into the disk driver 121, the ID number recorded in the floppy disk 122 is read (Step S20), and this ID number is compared with the ID number, which is read out from the leader track in the film 114. At this time, if these two ID numbers do not coincide with each other, the information such as This is not the outer record medium designated by the film and the like is displayed on the TV monitor 109 (Step S24). The user inserts the correct floppy disk into the disk driver 121 in accordance with the display (actually, the user can mount the correct floppy disk by looking at the ID number which is printed on the external surface of the floppy disk).

It is judged from the ID number of the outer record medium whether or not the outer record medium, in which the information relating to the film 114 is recorded, corresponds to the outer record medium connected to the film player in the step S22. There is another method in which the ID number of the film is recorded in the outer record medium, which is used for the film, so that the above-mentioned judgement can be made.

In the case when the floppy disk, in which the information relating to the film is recorded, is inserted into the disk driver 121, the magnetic information recorded in the floppy disk is read out to be recorded in the RAM 140A (Step S26).

After the regeneration of the magnetic information, which is recorded in the outer record medium, is completed, the magnetic information recorded in the film 114 is read to be recorded in the RAM 140A (Step S28). Then, after the abovementioned operation is over, various kinds of processing is performed in accordance with the magnetic information, which is recorded in the RAM 140A.

As described in this embodiment, the outer record medium is suitably used. When the outer record medium is used, the ID number indicating the outer record medium is recorded on the film, so that the recording capacity of the film can be substantially expanded.

The ID number is recorded as the outer record medium ID information in advance in the floppy disk which is used in this embodiment. However, the ID information can be optionally set by the user or the apparatus which performs the magnetic recording so as to be recorded in the floppy disk, so that the film can correspond to the outer record medium.

Next, an explanation will be given of the embodiment in which the recording capacity of the film is substantially increased. The recording capacity of the film can be expanded by increasing the recording density of the film. If a standard recording density for the magnetic recording of a camera is 20 (bit/mm), the recording density can be more than 20 in a high-performance film player.

Accordingly, to make up for the deficiency of the recording capacity of the film, the recording density for recording information in the film is freely set. That is, the recording density is variably set in accordance with the volume of the information.

However, there is a following problem in the case that the recording density is freely set in the film player. That is, when magnetic information is read by a film player which is different from the film player which performed the magnetic recording, the capacity of the film player which performs reading is less than the volume of the information recorded in the film. As a result, the film player cannot deal with the information.

Therefore, the recording density, which is applied at the time of recording information in the frame track, is recorded in the leader track of the film 114. As a result, it is possible to freely set the recording density in accordance with the type of the apparatus and the volume of the information to be recorded. Here, the recording density in the leader track is always 20 (bit/mm).

Even if the recording density is fixed, the recording capacity can be substantially expanded by decreasing the number of times the magnetic information is written. The same information is written the plural times in the same frame track so as to prevent an error in writing can be coped with. The number of times the information is written depends on the control of the film conveyance, the performance of the magnetic head and the like. Accordingly, the higher an apparatus's performance of the magnetic recording becomes, the lesser the number of times the information is written becomes. As a result, the recording capacity is substantially increased.

For example, the magnetic information is written three times by an apparatus having a low performance of magnetic recording such as a small-sized and lightweight camera and the like. On the other hand, it is sufficient for the duplicate recording if the information is written twice by an apparatus having a high performance of magnetic recording such as a film player and the like.

Therefore, when the magnetic information is recorded in the film player, the number of writing times is decreased in accordance with the volume of the information, so that the recording capacity of the film can be expanded.

Figure 5:
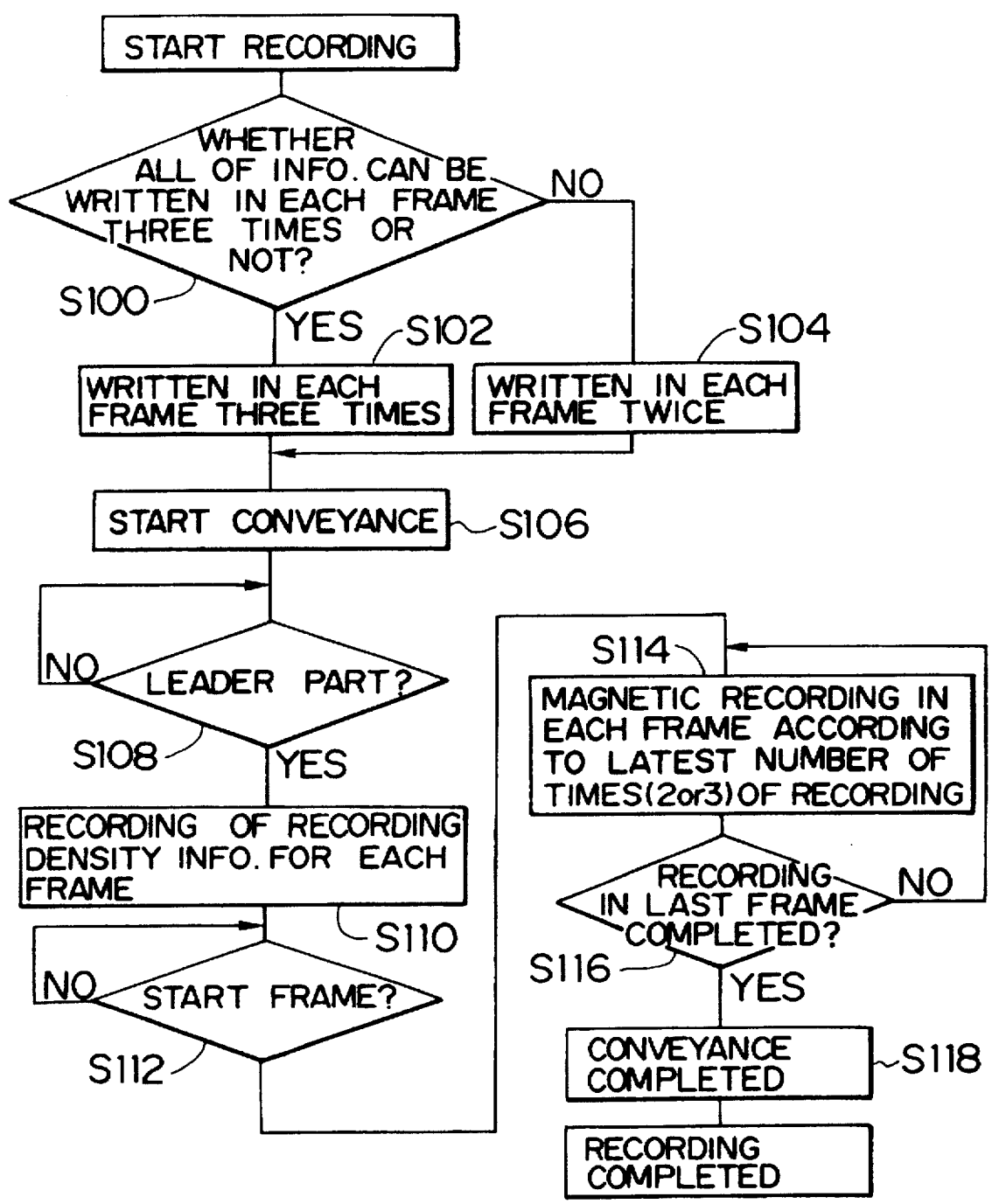
FIG. 5 is a flow chart illustrating a method of recording magnetic information in the case that a magnetic recording density is variable; and, FIG. 6 is a flow chart illustrating the procedure for regenerating magnetic information as to the film, which is recorded in the procedure of FIG. 5.

FIG. 5 shows the procedure of above-described recording method for increasing the recording capacity.

When the magnetic information is recorded by the film player, the user or the apparatus sets a recording density of the frame track in accordance with the magnetic information to be recorded. Next, it is judged whether all of the magnetic information can be recorded in the frame track with the recording density when written three times (Step S100). If magnetic information can be written three times, it is instructed to write information three times (Step S102). If information can be written only twice, it is instructed to write twice.

Then, the film starts being conveyed (Step S106) to a position where magnetic information is recorded in the leader track (Step S108). After that, the recording density for recording the magnetic information in the frame track is recorded in the leader track (Step S110).

Next, the film is conveyed in the feeding direction. When the film is conveyed to the first frame track (Step S112), the magnetic information is recorded with the originally-set recording density and writing times.

Then, the recording of the magnetic information continues until the information is recorded in the last frame track (Step S116). When the magnetic recording in the last frame track is over, the film conveyance is stopped (Step S118), and the recording operation ends.

Figure 6:
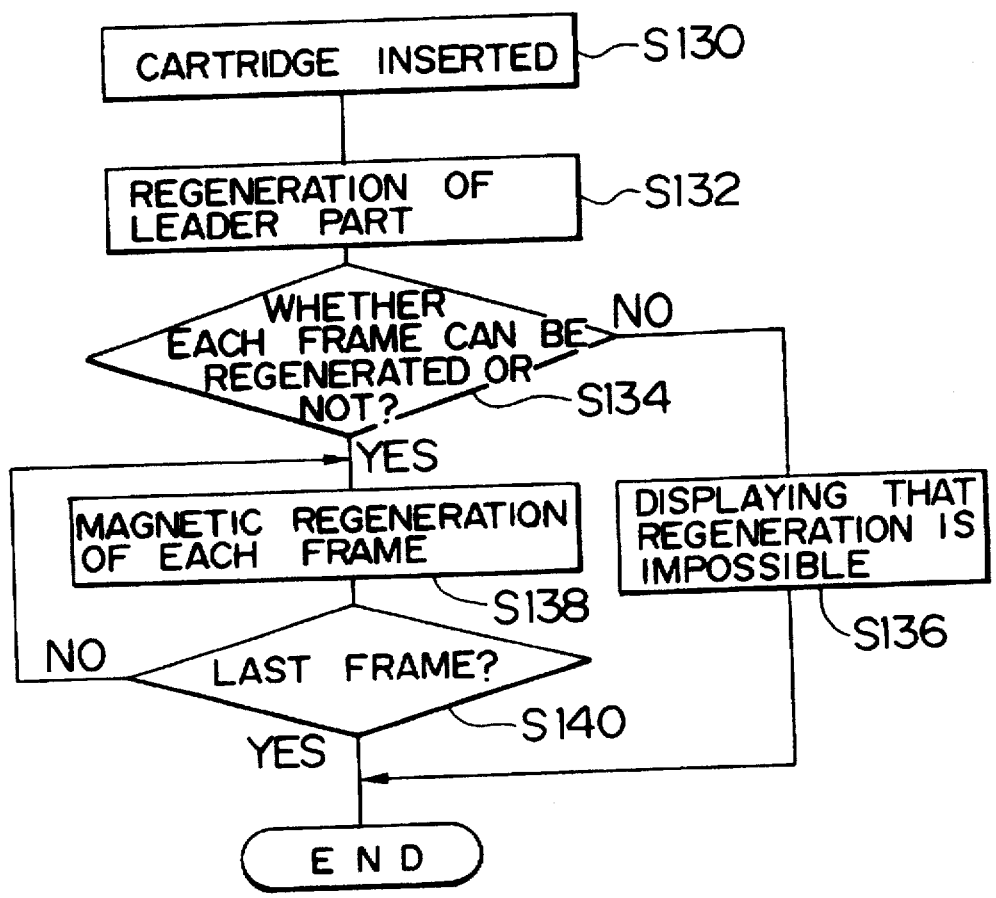

FIG. 6 is a flow chart in the case when the magnetic information is recorded as shown in FIG. 5 and the magnetic information is read out from the film on which the magnetic information is recorded at an optional recording density.

At first, when the film cartridge is set in the film player (Step S130), the film is pre-scanned. At this time, a recording density of each frame track, which is recorded in the leader track on the film 114, is read out (Step S132). Then, it is judged whether or not the readout recording density, can be handled by the film player (Step S134).

If the recording density cannot be handled, it is displayed on the TV monitor that the magnetic regeneration is impossible (Step S136). On the other hand, if the recording density can be handled, the magnetic information is read in accordance with the recording density (Step S138). The reading of the magnetic information is carried out up to the last frame track (Step S140), and the operation is ended.

As has been described above, according to the method of recording magnetic information of the present invention, a part or all of the magnetic information to be recorded on the film is recorded in the outer record medium, and the ID information identifying the outer record medium is recorded in the leader track at the forward end of the film. As a result, the recording capacity of the film can be substantially increased, and the outer record medium can be retrieved and collated in accordance with the ID information recorded in the leader track. Moreover, according to the present invention, the recording capacity of the film can be substantially increased by enlarging the recording capacity of the film for recording magnetic information in the film, or decreasing the number of recording times of a duplicate recording.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method of recording magnetic information in a magnetic track on a roll of photographic film, comprising the steps of:

dividing said magnetic track into a leader track in a leader part at a forward end of said photographic film, the leader track storing information relating to the entire roll of film, and a frame track which is located at the rear of the leader part and corresponds to each frame, the frame track storing information relating to individual frames;

recording a part or all of magnetic information which is not recordable in said leader track and said frame track, in an outer record medium; and recording information identifying the outer record medium in said leader track.

2. The method of recording magnetic information according to claim 1, wherein said information identifying the outer record medium is recorded in said outer record medium, and the recorded information identifying the outer record medium is collated with the information recorded in said leader track.

3. The method of recording magnetic information according to claim 1, wherein film ID information which identifies said photographic film is recorded on said photographic film, and said film ID information is recorded in said outer record medium, so that the film ID information recorded on said photographic film is collated with the film ID information recorded in said outer record medium.

4. The method of recording magnetic information according to claim 3, wherein said film ID information recorded in said photographic film is recorded in said leader track as magnetic information.

5. The method of recording magnetic information according to claim 3, wherein said film ID information recorded in said photographic film is recorded as optical information.

6. A method of recording magnetic information in a magnetic track on a roll of photographic film, comprising the steps of:

dividing said magnetic track into a leader track in a leader part at a forward end of the photographic film, the leader track storing information relating to the entire roll of film, and a frame track which is located at the rear of the leader part and corresponds to each frame, the frame track storing information relating to individual frames;

recording information indicating recording density, with which magnetic information is recorded in said frame track, in said leader track; and recording magnetic information in said frame track with the recording density which is recorded in said leader track.

7. A method of recording magnetic information in a magnetic track on a roll of photographic film comprising the step of repeatedly recording the same magnetic information on the roll of photographic film a set number of times, wherein the number of times the same magnetic information is recorded is set according to a volume of magnetic information.

8. A method for recording information related to images stored on a roll of photographic film comprising the steps of:

obtaining information relating to image frames contained on the roll of photographic film;

determining whether all of the obtained information is recordable on the roll of photographic film;

recording at least some of the obtained information on a secondary recording medium when said determining step determines that not all of the obtained information is recordable on the roll of photographic film; and indicating the identity of the secondary recording medium on the roll of photographic film when at least some of the obtained information is stored on the secondary recording medium.

9. The method of claim 8, wherein the obtained information relates to information used by photo-developers making prints from the image frames stored on the roll of photographic film.

10. The method of claim 8, wherein the obtained information allows automatic generation of the image frames stored on the roll in a desired format when the roll of film is mounted in a film player.

11. The method of claim 8, wherein the roll of photographic film has a magnetic recording layer and said determining step determines whether the volume of obtained information exceeds the storage capacity of the magnetic recording layer.

12. The method of claim 8, wherein the roll of photographic film is divided into a leader section and a frame storage section and said indicating step records the identity of the secondary recording medium in the leader track.

13. The method of claim 8, wherein the secondary recording medium is a floppy disk, a hard disk, an optical magnetic disk, or an IC memory card.

14. The method of claim 8, wherein the roll of photographic film is assigned an identification number which is recorded on the secondary recording medium.

15. A method for recording, at a variable recording density, information on a roll of photographic film comprising the steps of:

obtaining information relating to image frames contained on the roll of photographic film;

determining the volume of the obtained information;

setting the recording density based on the volume of obtained information;

recording the obtained information on the roll of photographic film at the set recording density; and recording the set recording density on the roll of photographic film.

16. The method of claim 15, wherein the roll of photographic film is divided into a leader section and a frame storage section and the set recording density is recorded in the leader track.

17. The method of claim 16, wherein the recording density of the leader track is not variable.

18. A method for recording information, at a fixed recording density, on a roll of photographic film comprising the steps of:

obtaining information relating to image frames contained on the roll of photographic film;

judging the volume of obtained information;

determining how many times the obtained information is repeatedly recordable on the roll of photographic film based on the judged volume; and repeatedly recording the obtained information the number of times determined in said determining step.

19. The method of claim 18, further comprising the step of:

recording the recording density on the roll of photographic film.

20. The method of claim 19, wherein the roll of photographic film is divided into a leader section and a frame storage section and the recording density is recorded in the leader section.

* * * * *